United States Patent Office 2,965,620
Patented Dec. 20, 1960

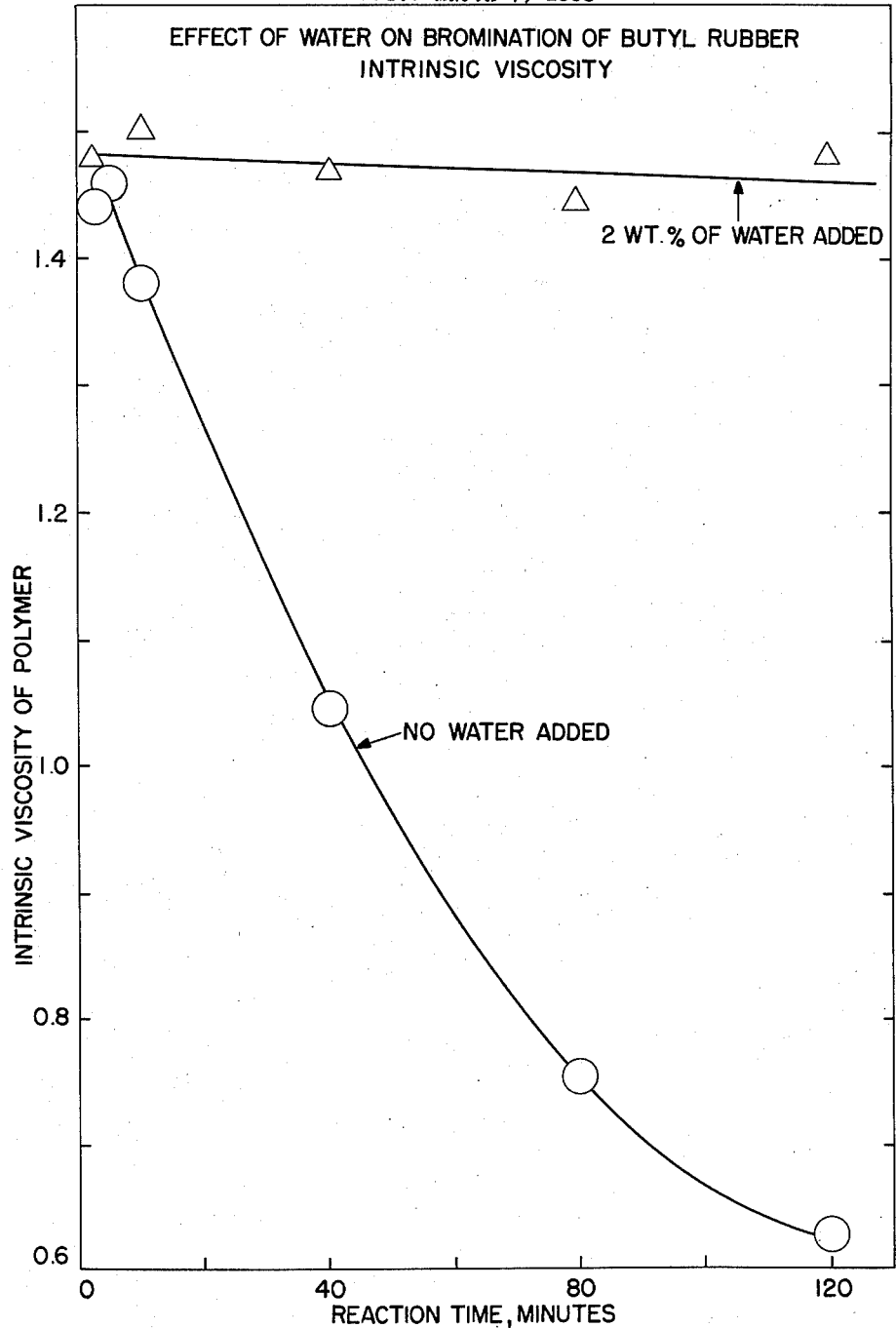

2,965,620

PROCESS FOR HALOGENATING COPOLYMERS

George E. Serniuk, Roselle, Delmer L. Cottle, Highland Park, and Theodore Lemiszka, Roselle, N.J., assignors to Esso Research and Engineering Company, a corporation of Delaware Filed Mar. 7, 1958, Ser. No. 719,955

6 Claims. (Cl. 260—85.3)

This invention relates to halogenating butyl rubber in the presence of water. Heretofore, butyl rubber has been carefully brominated or chlorinated with gaseous, liquid and solid halogenating agents to contain critically small amounts of combined halogen. Such halogenated isoolefin-multiolefin butyl rubber type copolymers have been found to be vulcanizable with zinc oxide alone and covulcanizable with high unsaturation rubbers such as natural and/or diene-styrene coploymer rubbers.

Whether the solid butyl rubber copolymer is halogenated per se or the copolymer is first dissolved in an inert solvent and then halogenated, some molecular weight breakdown of the copolymer usually occurs. Also, if more than the critically small amounts of halogen abovementioned are combined with butyl rubber, drastic molecular weight degradation ensues.

In accordance with the present invention, the abovementioned disadvantages are overcome and undegraded halogenated butyl rubbers are produced by dissolving the butyl rubber in a solvent, adding thereto an aqueous medium, agitating the resulting mixture to form a dispersion of the dissolved butyl rubber in water, and contacting the resulting dispersion with the particular halogenating agent or agents desired. In practicing the present invention, the amount of water desirably present is about 0.001 to 50, advantageously about 0.1 to 40 and preferably about 1.0 to 30 parts by weight of water per 100 parts by weight of butyl rubber.

The invention will be best understood from the following description when read in connection with the accompanying drawing in which the single figure is a graphical representation of the effect of water on the molecular weight as measured by intrinsic viscosity of brominated butyl rubber.

Butyl rubber copolymers comprise a major proportion (preferably about 97.0 to 99.5 weight percent) of a $C_4$ to $C_8$ isoolefin such as isobutylene, 2-methyl-1-butene or 3-methyl-1-butene, etc., with a minor proportion (preferably about 15 to 0.5 weight percent) of a multiolefin of about 4 to 14, preferably of about 4 to 6 carbon atoms, and are commonly referred to in patents and technical literature as "butyl rubber," or GR–I rubber (Government Rubber–Isobutylene), for example in textbook "Synthetic Rubber" by G. S. Whitby. The preparation of butyl rubber is described in U.S. Patent 2,356,128 to Thomas et al. The multiolefinic component of the copolymer is preferably a conjugated diolefin such as isoprene, butadiene, dimethylbutadiene, piperylene, or such multiolefins as cyclopentadiene, cyclohexadienes, myrcene, dimethallyl, allo-ocymene, vinyl fulvenes, etc. The copolymer comprising isobutylene and isoprene is preferred, although the copolymer may contain about 0.05 to 20.0, preferably about 0.2 to 5.0, parts by weight based on total reacting co-monomers of such mono-olefinic compounds as styrene, p-methylstyrene, alpha-methylstyrene, indene, dihydronaphthalene, dichlorostyrene, p-chlorostyrene, mixtures thereof, etc. Such a copolymer has a Staudinger molecular weight between about 20,000 and 300,000, or a viscosity average molecular weight of about 150,000 to 2,000,000 and an Iodine No. between about 0.5 and 20.

In producing halogenated butyl rubber in accordance with the present invention, unmodified, unvulcanized butyl rubber is carefully halogenated in presence of the above-described amounts of water until it contains about at least 0.5 weight percent (preferably at least about 1.0 weight percent), but not more than about "X" weight percent of combined halogen wherein:

$$X = \frac{M_3 L}{(100-L)M_1 + L(M_2+M_3)} \times 100$$

and:

L = mole percent of the multiolefin in the polymer
$M_1$ = molecular weight of the isoolefin
$M_2$ = molecular weight of the multiolefin
$M_3$ = atomic weight of the halogen Preferably, there should be at least about 0.5 weight percent of combined halogen in the polymer but not more than about 1 atom of chlorine or 3 atoms of bromine combined in the polymer per molecule of multiolefin present therein; i.e., per double bond in the polymer.

Suitable halogenating agents which may be employed are gaseous chlorine, liquid bromine, alkali metal hypochlorites or hypobromites, sulfur chlorides or bromides (particularly oxygenated sulfur chlorides or bromides), pyridinium chloride perchloride, N-bromo-succinimide, iodine monochloride, alpha-chloroacetoacetanilide, tribromophenol bromide, N-chloroacetamide, N,N'-dimethyl-5,5 dichloro or dibromo hydantoin, and other common halogenating agents.

The halogenation is generally conducted at above 0° C. to below about +150° C., advantageously at about 0° to 65° C., preferably at about 20° to 50° C. (room temperature being satisfactory), depeneding upon the particular halogenation agent, for about one minute to several hours. An advantageous pressure range is from about 0.5 to 400 p.s.i.a.; atmospheric pressure being satisfactory. The halogenation conditions are regulated to halogenate the rubbery copolymer to the extent abovementioned.

According to the present invention, there is prepared a solution of the copolymer as above, in a suitable inert liquid organic solvent such as a $C_3$ to $C_{10}$, or preferably, a $C_5$ to $C_8$ inert hydrocarbon or halogenated derivatives of saturated hydrocarbons, examples of which are hexane, heptane, naphtha, mineral spirits, cyclohexane, alkyl substituted cycloparaffins, benzene, chlorobenzene, chloroform, trichlorethane, carbon tetrachloride, mixtures thereof, etc. This solution is then dispersed into water and the resulting dispersion or emulsion contacted with gaseous chlorine, liquid bromine or other halogenating agent which may be optionally dissolved in an inert solvent with or without being also dispersed into water.

The concentration of the butyl rubber in the solvent-aqueous medium will depend upon the type of reactor, molecular weight of the butyl rubber, etc. In general, the concentration of a butyl rubber having a viscosity average molecular weight of about 200,000 to about 1,500,000, if the solvent is a substantially inert hydrocarbon, will be between 1 and 30% by weight, preferably about 5 to 20%. If chlorine gas is employed to chlorinate such a rubbery solution, it may also be diluted with up to about 50 times its volume, preferably about 0.1 to 5.0 times its volume of an inert gas such as nitrogen, methane, ethane, carbon dioxide, etc.

The resulting halogenated butyl rubber polymer may be recovered in various manners. The polymer may be precipitated with acetone, or any other known non-solvent for the butyl rubber, and dried under about 1 to 760 millimeters or higher of mercury pressure absolute at about 0° to 180° C., preferably at about 50 to 150° C. (e.g., 70° C.). Other methods of recovering the halogenated butyl rubber polymer from the hydrocarbon solution of the same are by conventional spray or drum drying techniques. Alternatively, the halogenated butyl rubber-containing solution may be injected into a vessel containing agitated water heated to a temperature sufficient to flash off the hydrocarbon solvent and form an aqueous slurry of the halogenated butyl rubber. The halogenated butyl rubber may then be separated from this slurry by filtration, drying and extruding procedures. The halogenated copolymer formed advantageously has a viscosity average molecular weight of about 200,000 to 1,500,000 (i.e., about the same as the unhalogenated copolymer) and a mole percent unsaturation of about 0.5 to 15.0.

In order to more fully illustrate the present invention, the following experimental data are given:

EXAMPLE I

A butyl rubber copolymer having an intrinsic viscosity of 1.60, and a mole percent unsaturation of 1.6 was dissolved to form a 10 weight percent solution in $AlCl_3$ treated hexane. To this solution was added 6 weight percent of water based on copolymer and the mixture stirred into a fine dispersion in a Pfaudler reactor. There was then added to the resulting dispersion 6 weight percent of liquid bromine based on copolymer and a bromination reaction allowed to ensue at room temperature for the following periods of time with the resulting intrinsic viscosities now tabulated:

| Time in minutes— | Intrinsic viscosity |
|---|---|
| 10 | 1.58 |
| 20 | 1.59 |
| 30 | 1.60 |
| 45 | 1.57 |
| 60 | 1.59 |

The above data show that when butyl rubber is halogenated in the presence of water, molecular weight degradation of the rubber copolymer does not occur (i.e., the copolymer intrinsic viscosity is not lowered).

EXAMPLE II

The same general procedure as in Example I was repeated using a butyl rubber copolymer having an intrinsic viscosity of 1.10 and a mole percent unsaturation of 2.3 and substituting chlorine for bromine with the following results:

| Water, weight percent on butyl rubber | Intrinsic Viscosity | Chlorine in copolymer (weight percent) |
|---|---|---|
| 0 | 0.97 | 1.29 |
| 10 | 1.12 | 1.09 |
| 20 | 1.12 | 1.15 |

The above data show that chlorination of butyl rubber in the presence of water does not result in molecular weight breakdown of the butyl copolymer.

EXAMPLE III

The same general procedure of brominating butyl rubber in the presence of water as in Example I was repeated and compared to a control bromination in the absence of water. The original butyl rubber copolymer had an intrinsic viscosity of 1.60 and a mole percent unsaturation of 2.12. The results were as follows:

*Bromination with no water*

| Time in minutes— | Product intrinsic viscosity |
|---|---|
| 2.5 | 1.60 |
| 5 | — |
| 10 | 1.46 |
| 15 | — |
| 20 | 1.42 |
| 30 | 1.24 |
| 45 | 1.15 |
| 60 | 1.05 |
| 75 | 1.01 |
| 90 | 1.06 |
| 120 | 0.91 |

*Bromination with 4.8 weight percent water*

| Time in minutes— | Product intrinsic viscosity |
|---|---|
| 2.5 | 1.55 |
| 5 | 1.59 |
| 10 | 1.55 |
| 15 | 1.48 |
| 20 | 1.49 |
| 30 | 1.33 |
| 45 | 1.40 |

*Bromination with 19 weight percent water*

| Time in minutes— | Product intrinsic viscosity |
|---|---|
| 4.5 | 1.65 |
| 6 | 1.65 |
| 10 | 1.63 |
| 15 | 1.66 |
| 20 | 1.60 |
| 30 | 1.58 |
| 45 | 1.42 |
| 60 | 1.55 |
| 75 | 1.51 |
| 90 | 1.56 |
| 120 | 1.55 |

The above data show that bromination of butyl rubber in the absence of water results in copolymer molecular weight breakdown (lowered intrinsic viscosities) but that bromination in the presence of water results in essentially no butyl rubber copolymer degradation (i.e., essentially no lowering of intrinsic viscosities.

EXAMPLE IV

The same general procedure as in Example I was repeated for both bromination and chlorination of butyl rubber in the presence of water. The butyl rubber halogenated had an original intrinsic viscosity of 1.08 and a mole percent unsaturation of 1.60. Upon bromination at 80° C. in the presence of 2 weight percent of water until the product contained 1.78 weight percent bromine (i.e., for 3 minutes), essentially no change in the intrinsic viscosity and molecular weight of the rubbery copolymer was noted. Similarly, upon chlorination at 80° C. in the presence of 10 weight percent of water (based on butyl rubber), after 52 minutes the butyl rubber copolymer contained 0.86 weight percent combined chlorine. There was essentially no drop in intrinsic viscosity.

EXAMPLE V

The same general procedure as in Example I was repeated chlorinating butyl rubber with gaseous chlorine both in the presence and absence of water. The original butyl rubber copolymer had an intrinsic viscosity of 1.55 and a mole percent unsaturation of 1.6. The results were as follows:

| Time in minutes | Intrinsic viscosity | |
|---|---|---|
| | Chlorination in the absence of water | Chlorination in the presence of 6.0 wt. percent of water |
| 2.5 | 1.26 | 1.50 |
| 5.0 | 1.16 | 1.50 |
| 10 | 1.13 | 1.54 |
| 20 | 1.06 | 1.55 |
| 40 | 0.96 | 1.62 |
| 80 | 0.80 | 1.55 |

The above data show that chlorination of a butyl rubber copolymer in the absence of water results in copolymer molecular weight breakdown (i.e., lowered intrinsic viscosity) but that chlorination in the presence of water does not.

EXAMPLE VI

Referring now to the single figure of the accompanying drawing, a butyl rubber copolymer having an original intrinsic viscosity of 1.48 and a mole percent unsaturation of 1.6 was brominated as in Example I for 120 minutes both in the absence and presence of 2.0 weight percent of water to contain 2.3 weight percent combined bromine. During the bromination, the intrinsic viscosity was plotted against the reaction time in minutes with the results as depicted on the chart constituting the accompanying drawing. It will be observed that when the bromination is in the presence of 2.0 weight percent of water (based on butyl rubber) the intrinsic viscosity is unchanged during bromination but that when no water is added the intrinsic viscosity drops from about 1.48 to 0.62. This is a positive indication that bromination of butyl rubber in the presence of water does not involve molecular weight breakdown but that when no water is used molecular weight degradation occurs.

Resort may be had to modifications and variations of the disclosed embodiments without departing from the spirit of the invention or the scope of the appended claims.

What is claimed is:

1. A process for halogenating an isoolefin-multiolefin butyl rubber copolymer of a major portion of a $C_4$ to $C_8$ isoolefin and a minor portion of a $C_4$ to $C_{14}$ multiolefin which comprises dissolving about 100 parts by weight of said copolymer in a solvent, admixing therewith about 0.1 to 50 parts by weight based on copolymer of water so as to form a suspension of dissolved butyl rubber copolymer particles in water, and halogenating, at a temperature level of above 0° C. to about +150° C. the butyl rubber copolymer particles while thus suspended in water until the halogenated copolymer formed contains at least about 0.5 weight percent combined halogen but not more than about 1 combined atom of halogen per double bond in the copolymer.

2. A process according to claim 1 in which the halogen is chlorine.

3. A process according to claim 1 in which the halogen is bromine.

4. A process for halogenating an isoolefin-multiolefin butyl rubber copolymer of a major portion of a $C_4$ to $C_8$ isoolefin and a minor portion of a $C_4$ to $C_{14}$ multiolefin which comprises dissolving about 100 parts by weight of said copolymer in a solvent, admixing therewith about 0.1 to 50 parts by weight based on copolymer of water so as to form a suspension of dissolved butyl rubber copolymer particles in said water, and halogenating, at a temperature level of above 0° C. to about +150° C., the butyl rubber copolymer particles while thus suspended in water with a halogenating agent selected from the group consisting of chlorinating agents and brominating agents until the halogenated copolymer formed contains at least about 0.5 weight percent combined halogen but not more than about 1 combined atom of chlorine nor more than about 3 combined atoms of bromine per double bond in the copolymer.

5. A process according to claim 4 in which the halogenation reaction is carried out at a temperature level of between about 20° to 65° C. for a time of between about 1 minute and 5 days.

6. A process according to claim 4 in which the amount of water present is between about 1.0 and 30.0 parts by weight of water per 100 parts by weight of isoolefin-multiolefin butyl rubber copolymer.

References Cited in the file of this patent

UNITED STATES PATENTS

| 2,631,984 | Crawford et al. | Mar. 17, 1953 |
| 2,681,899 | Crawford et al. | June 22, 1954 |
| 2,698,041 | Morrissey et al. | Dec. 28, 1954 |
| 2,720,479 | Crawford et al. | Oct. 11, 1955 |
| 2,732,354 | Morrissey et al. | Jan. 24, 1956 |
| 2,804,448 | Hallenbeck | Aug. 27, 1957 |
| 2,809,372 | Frederick et al. | Oct. 8, 1957 |
| 2,816,098 | Morrissey | Dec. 10, 1957 |
| 2,833,734 | Morrissey et al. | May 6, 1958 |

FOREIGN PATENTS

| 476,269 | Great Britain | Dec. 6, 1937 |